(12) United States Patent
Berkemeier

(10) Patent No.: US 9,822,715 B2
(45) Date of Patent: Nov. 21, 2017

(54) IGNITION PLUG FOR A CYLINDER IN A COMBUSTION ENGINE

(71) Applicant: Ford Global Technologies, LLC, Dearborn, MI (US)

(72) Inventor: Oliver Berkemeier, Bergisch Gladbach (DE)

(73) Assignee: Ford Global Technologies, LLC, Dearborn, MI (US)

( * ) Notice: Subject to any disclaimer, the term of this patent is extended or adjusted under 35 U.S.C. 154(b) by 33 days.

(21) Appl. No.: 14/997,232

(22) Filed: Jan. 15, 2016

(65) Prior Publication Data
US 2016/0215710 A1   Jul. 28, 2016

(30) Foreign Application Priority Data
Jan. 23, 2015  (DE) .......................... 10 2015 201 167

(51) Int. Cl.
| | |
|---|---|
| *F02D 37/02* | (2006.01) |
| *H01T 13/18* | (2006.01) |
| *F02D 17/02* | (2006.01) |
| *H01T 13/20* | (2006.01) |
| *F02P 13/00* | (2006.01) |

(Continued)

(52) U.S. Cl.
CPC ............. *F02D 37/02* (2013.01); *F02D 17/02* (2013.01); *F02D 41/0087* (2013.01); *F02P 13/00* (2013.01); *F16J 15/04* (2013.01); *H01T 13/18* (2013.01); *H01T 13/20* (2013.01); *H01T 15/00* (2013.01); *H01T 13/14* (2013.01); *H01T 13/34* (2013.01)

(58) Field of Classification Search
CPC ........ F02D 17/02; F02D 37/02; F02D 41/0087; F02P 13/00; F16J 15/04; H01T 13/14; H01T 13/18; H01T 13/20; H01T 13/34; H01T 15/00
USPC ................ 123/143 C, 169 R, 169 E, 169 EA, 123/169 EL, 196 S, 198 D, 198 DC, 123/198 F, 608, 621, 625
See application file for complete search history.

(56) References Cited

U.S. PATENT DOCUMENTS 2,071,450 A * 2/1937 Anderson ............... H01T 13/32
                                                              123/169 EA
2,691,971 A   10/1954 Dutterer
(Continued)

FOREIGN PATENT DOCUMENTS

| DE | 571610 C | 3/1933 |
|---|---|---|
| DE | 102014103308 A1 | 9/2014 |

(Continued)

*Primary Examiner* — John Kwon
*Assistant Examiner* — Johnny H Hoang
(74) *Attorney, Agent, or Firm* — Julia Voutyras; McCoy Russell LLP

(57) ABSTRACT

The present disclosure relates to an ignition plug for initiating combustion in a cylinder of a combustion engine, wherein the cylinder can be operated in an active mode and in a deactivated mode. The ignition plug comprises a housing that can be connected to the cylinder, an insulator is fastened to the housing and comprises an axial bore hole and a middle electrode is arranged in the axial bore hole to form an annular gap between the middle electrode and the insulator. The ignition plug comprises a sealing element that can be activated in dependence upon the mode of the cylinder so as to seal the gap preventing any seepage of oil during cylinder deactivation.

18 Claims, 2 Drawing Sheets

(51) Int. Cl.
*H01T 15/00* (2006.01)
*F16J 15/04* (2006.01)
*F02D 41/00* (2006.01)
H01T 13/34 (2006.01)
H01T 13/14 (2006.01)

(56) References Cited

U.S. PATENT DOCUMENTS

| | | | | |
|---|---|---|---|---|
| 5,434,741 A * | 7/1995 | Mulkins | ............... | H01T 13/52 |
| | | | | 123/169 EA |
| 5,870,012 A * | 2/1999 | Sakamaki | ............... | H01T 13/44 |
| | | | | 123/621 |
| 6,745,744 B2 * | 6/2004 | Suckewer | ............... | F02D 19/081 |
| | | | | 123/297 |
| 7,513,234 B1 * | 4/2009 | Baldwin | ............... | H01T 13/26 |
| | | | | 123/169 EA |
| 8,127,741 B2 * | 3/2012 | Johng | ............... | F02F 1/242 |
| | | | | 123/169 EA |
| 8,851,047 B2 * | 10/2014 | McAlister | ............... | F02M 57/06 |
| | | | | 123/169 EA |
| 9,016,253 B2 * | 4/2015 | Kishimoto | ............... | H01T 13/34 |
| | | | | 123/169 E |
| 2013/0229102 A1 | 9/2013 | Raasch et al. | | |

FOREIGN PATENT DOCUMENTS

| | | |
|---|---|---|
| GB | 1384199 A | 2/1975 |
| GB | 2185529 A | 7/1987 |
| WO | 2010043543 A1 | 4/2010 |

* cited by examiner

IGNITION PLUG FOR A CYLINDER IN A COMBUSTION ENGINE

CROSS REFERENCE TO RELATED APPLICATION

The present application claims priority to German Patent Application No. 102015201167.4, filed Jan. 23, 2015, the entire contents of which are hereby incorporated by reference for all purposes.

FIELD

The present description relates generally to system and methods for an ignition plug for initiating combustion in a cylinder of a combustion engine, wherein the cylinder can be operated in an active mode and a deactivated mode.

BACKGROUND/SUMMARY

A combustion engine uses a piston to compress an air-fuel mixture in the cylinder and to subsequently ignite said air-fuel mixture. The increase in volume caused by the explosion of the air-fuel mixture drives the piston, which provides the mechanical energy (power stroke) that can be used in different ways. The efficient operation of a combustion engine that is not self-igniting depends greatly on the air-fuel mixture being ignited at the correct point in time. Ignition plugs are used for igniting the air-fuel mixture and said ignition plugs protrude in part into the cylinder and ignite the air-fuel mixture by means of a spark that is generated across a spark gap that is defined by means of two or more electrodes. A middle electrode in the ignition plug is influenced by a high voltage that is dissipated by way of the ground electrode.

In order to ensure that the spark is actually formed across the spark gap, the rod-shaped middle electrode is surrounded in a radial manner by the insulator that is embodied from a ceramic material or comprises a ceramic material. The rod-shaped middle electrode is only free in the axial direction. In this way, the spark may be prevented from bypassing the ground electrode and jumping directly from the middle electrode to the housing that is typically manufactured from metal.

Known ignition plugs are illustrated by way of example in U.S. Pat. No. 2,691,971 A, WO 2010/043543 A1, US 2013/0229102 A1 and DE 10 2014 103 308. As a result of the high voltage at which the middle electrode is operating, the middle electrode heats up and this causes said middle electrode to expand as a result of its comparatively high thermal coefficient of expansion. The gap prevents the insulator from being damaged as a result of this expansion. In order to ensure that the expansion does not damage the insulator, the gap is produced with a defined over-dimensioning so that even when the middle electrode is in the heated state, it does not come into contact with the insulator. Nonetheless, the gap is so small that oil cannot seep into the gap. Furthermore, the gap ensures that the middle electrode that becomes very hot during the operation is thermally separated from the insulator since air has a comparatively low thermal conductivity characteristic.

With a view to attempting to reduce fuel consumption and consequently the $CO_2$ emissions, modern combustion engines are provided with a cylinder deactivation facility so that one or more switchable cylinders of the combustion engine can be deactivated depending upon the power output requirement and thus operated in the deactivated mode in which the cylinder does not contribute to the power output. The term activated mode describes the mode in which the switchable cylinders contribute to the power output. Since the ignition plug is also switched off in the deactivated state, the middle electrode cools down which results in the gap increasing in size and consequently oil can now pass into the gap. A larger quantity of air-fuel mixture may collect in the gap, said mixture comprising components of oil. When the cylinder is reactivated, the middle electrode heats up almost suddenly and the gap becomes smaller. The oil that is in contact with the middle electrode becomes coked as a result of the middle electrode heating up rapidly and as a result solid deposits are formed in the gap. The deposits that increase in size over time can damage the insulator. As mentioned before, the insulator frequently comprises a ceramic material that is brittle so that the insulator can tear as the cylinder is activated and pieces can break off from the insulator. In the worst case scenario, the middle electrode is no longer insulated with respect to the wall of the housing such that the high voltage may bypass the ground electrode and discharge directly from the middle electrode to the housing, which causes undesired misfires.

The inventors herein have recognized the above issues and identified an approach by hhich the issues described above may be at least partly addressed. It is therefore the object of the present disclosure to develop the ignition plugs such that the insulator is protected if the ignition plug is used in the combustion engines that have a cylinder deactivation facility.

In accordance with the disclosure, the ignition plug comprises a sealing element that can be activated based on the mode of the cylinder so as to seal the gap. As already mentioned, the gap in the activated mode is so small that oil cannot seep into the gap. If a switchable cylinder is in the deactivated state, then the sealing element is activated and the gap that is then increasing in size is sealed, as a result of which oil is prevented from passing into the gap. It is not necessary for the gap to be completely sealed. On the contrary, it is sufficient that the gap is reduced in size to the extent that oil can no longer pass into the gap. This optimal gap may be termed as gap seal. Consequently, deposits that could damage the insulator are prevented from forming. It is also possible in accordance with the disclosure to operate the ignition plug over a longer period of time at full functional capability in combustion engines that comprise a cylinder deactivation facility.

The sealing element can be activated by an ignition coil, which cooperates with the ignition plug, or by an open-loop and closed-loop unit for controlling the combustion engine in an open-loop and/or closed loop manner. The high voltage is typically provided by an ignition coil that is connected in a conductive manner to the ignition plug. As described above, the ignition plug is likewise not operated when the cylinder is in the deactivated mode so that the idle operating state of the ignition coil can be used as a signal to activate the sealing element. Modern combustion engines comprise a complex electronic open-loop and closed-loop control unit that may control the ignition sequence of the cylinders by means of correspondingly controlling the ignition coils that needs to be correspondingly changed as one or more cylinders are switched off. The open-loop control unit can consequently also be used for activating or deactivating the sealing element. In this respect, components that are already provided are used to activate or deactivate the sealing element so that the constructive additional outlay can be kept to a minimum.

In one example, the sealing element may comprise a heating device for heating the middle electrode. As mentioned before, the gap between the middle electrode and the insulator increases in size as a result of the middle electrode cooling down after a switchable cylinder has been deactivated. Since the middle electrode must be embodied from an electrically conductive material, it is usually embodied from a metal and for this reason the middle electrode has a relatively high thermal coefficient of expansion. In the case of a cylinder that has been deactivated, the middle electrode can be heated with the aid of the heating device so that the size of the gap that is formed in the deactivated mode can be kept small enough such that oil cannot pass into the gap. In this respect, the middle electrode acts as a sealing body that can be used to seal the gap. Thereby, the above described disadvantageous effects of the deposits that form in the gap are eliminated or are considerably reduced in comparison to an ignition plug that does not comprise a heating device. In this way, the ignition plug can be operated over a longer period of time at full functional capability.

In one example embodiment, the heating device can comprise heating wires that run in the middle electrode. Heating wires comprise a high electrical resistance so that they heat up under the influence of an electrical current. As mentioned before, ignition coils that provide a high voltage are typically provided. The heating wires can be connected to the ignition coils and are influenced by said ignition coils with a corresponding voltage or a corresponding current. When the heating wires are not directly connected to the ignition coils, the electronic system for the ignition coil can at least be used so that additional installation space is not required. Furthermore, the heating wires can be connected by way of example by connecting pins to existing cable harnesses if said cable harnesses are providing a sufficiently high current. As a consequence, the middle electrode can be heated up without the need for additional components. The additional outlay for converting the solution in accordance with the disclosure is consequently kept to a minimum which applies in particular to the outlay with regard to the cabling since existing lines and cable harnesses can be used.

The object is further achieved by means of a method for operating an ignition plug so as to initiate combustion in a switchable cylinder of a combustion engine, wherein the switchable cylinder can be operated in an active mode and in a deactivated mode. The ignition plug comprises a housing that can be connected to the cylinder, an insulator that is fastened to the housing and comprises an axial bore hole, a middle electrode that is arranged in the axial bore hole to form an annular gap between the middle electrode and the insulator, a ground electrode that is fastened to the housing, and a sealing element that can be activated so as to seal the gap. The method comprises activating the sealing element when the cylinder is being operated in the deactivated mode and deactivating the sealing element when the cylinder is being operated in the activated mode.

In this way by virtue of the possibility of sealing the gap at least in the deactivated mode of the cylinder, the collection of oil and formation of deposits in the gap are prevented or at least can be considerably reduced so that the damage to the insulator is avoided when a switchable cylinder is returned to the activated mode. In comparison to conventional ignition plugs for combustion engines that have a cylinder deactivation facility, the ignition plug can be operated over a longer period of time at full functional capability.

As described above, when the cylinder is in the deactivated mode, oil can pass into the gap causing deposits to form on the middle electrode. Since this effect does not occur when the switchable cylinder is in the activated mode, the sealing element itself can be deactivated when the cylinder is in the activated mode, as a result of which energy can be saved depending upon the design of the sealing element.

DETAILED DESCRIPTION

Figure 1:
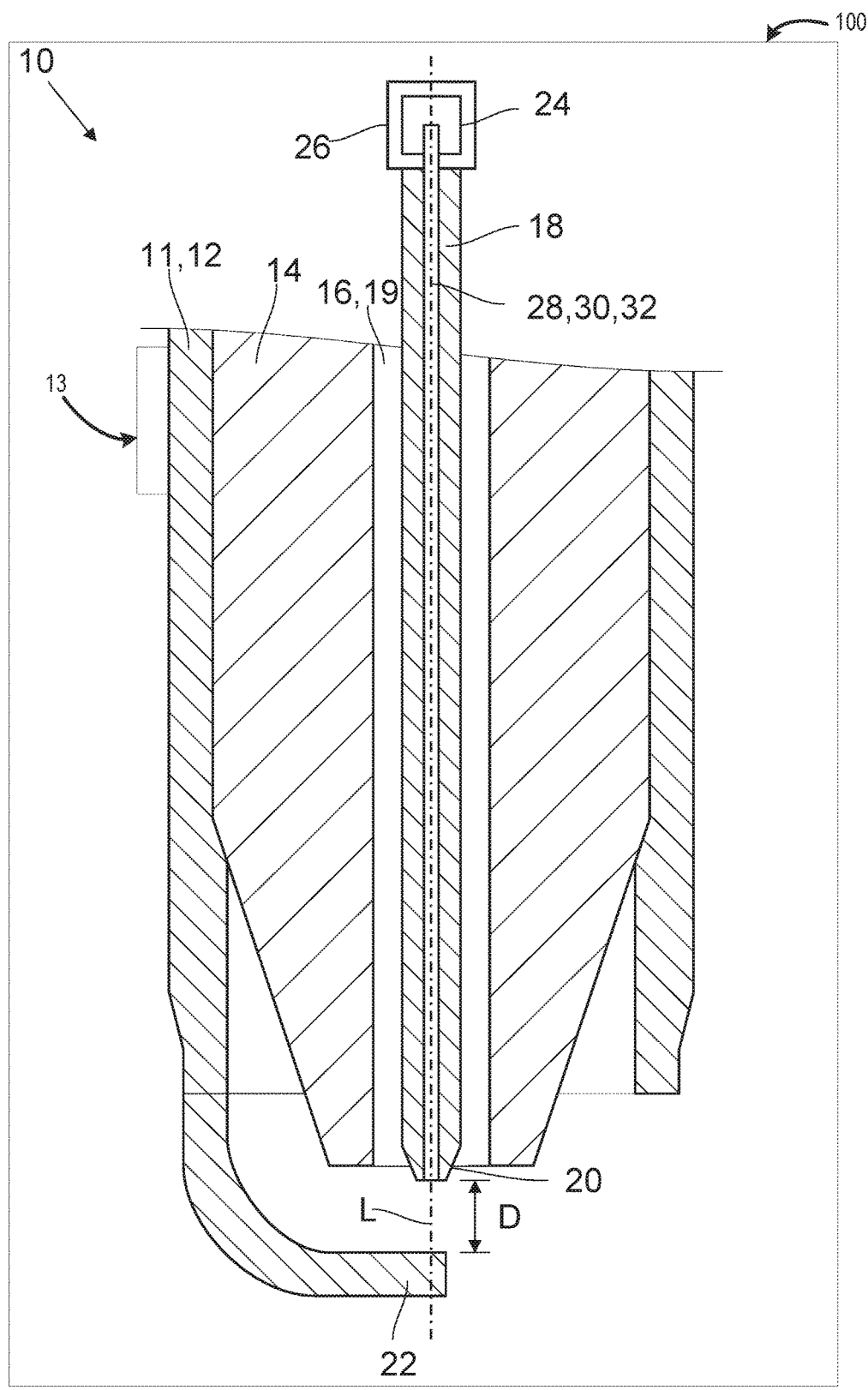
FIG. 1 shows an example embodiment of an ignition plug used in an internal combustion engine.

FIG. 1 illustrates an exemplary embodiment of an ignition plug 10 in accordance with the disclosure that comprises a housing 11 having a wall 12 that may be manufactured from metal. The housing 11 is embodied in an approximately tubular manner and defines a longitudinal axis L. The wall 12 comprises typically a thread (13), with which the ignition plug 10 can be screwed into a corresponding thread in a cylinder, of a combustion engine 100.

An insulator 14 is fastened to the wall 12 and said insulator comprises an axial bore hole 16 that penetrates the entire insulator 14 in an axial manner. A middle electrode 18 is arranged in this bore hole 16 and said middle electrode is fastened to the wall 12 of the housing 11 in such a manner that an annular gap 19 is formed between the insulator 14 and the middle electrode 18. The middle electrode 18 forms at the free end an ignition tip 20 that protrudes in an axial manner slightly beyond the insulator 14. A ground electrode 22 is fastened to the housing 11 and in this example, said ground electrode is embodied in an approximately L-shaped manner and extends with its free end in a radial manner inwards beyond the longitudinal axis L, so that said electrode, when viewed along the longitudinal axis L, at least in part covers the ignition tip 20. A distance D is created between the ignition tip 20 and the ground electrode 22 along the longitudinal axis L.

The middle electrode 18 is connected to an ignition coil 24 that in turn is controlled in an open-loop and/or closed-loop manner by an open-loop and closed-loop control unit 26. Control unit 26 may be a controller configured with computer-readable instructions stored on non-transitory memory. The instructions may enable the open and closed loop control of the ignition coil. An example method performed based on the instructions is shown with reference to FIG. 2. The open-loop and closed-loop control unit 26 carries out a plurality of tasks during the operation of the combustion engine. As an example, the open-loop and closed-loop control unit 26 decides whether the relevant switchable cylinder is being operated in the activated mode or in the deactivated mode. A cylinder that is being operated in the activated mode contributes to the power output of the combustion engine, whereas when the cylinder is being operated in the deactivated mode, it does not output any power. Further, based on the activated or deactivated operation mode of the switchable cylinder, the control unit may adjust the operation of a sealing element of the ignition plug.

The ignition plug 10 comprises a sealing element 28 with which the gap 19 can be sealed in dependence upon the mode of the cylinder. In the illustrated example, the sealing element 28 comprises a heating device 30 with which the middle electrode 18 can be heated up. For this purpose, the sealing element 28 can comprise one or more heating wires 32 that, as illustrated, can be connected to the ignition coil 24 or to the open-loop and closed-loop control unit.

The ignition plug 10 is operated in the following manner: an air-fuel mixture is compressed in the cylinder by means of a piston and said air-fuel mixture must be ignited at the correct moment so that the piston can perform a power stroke as a result of the ensuing expansion of volume. The ignition plug 10 is screwed into the cylinder head of the cylinder to the extent that the ignition tip 20 and the ground electrode 22 protrude into the interior of the cylinder. If the air-fuel mixture is compressed in the cylinder, the ignition coil 24 generates a high voltage that is transmitted to the middle electrode 18. As a result of the insulator 14, the high voltage can only be discharged to the ignition tip 20. The ground electrode 22 provides the high voltage with the sole discharge opportunity, wherein a spark jumps from the ignition tip 20 to the ground electrode 22 so that a spark gap is formed between the ignition tip 20 and the ground electrode 22 over the distance D. Both the ignition tip 20 and also the ground electrode 22 are located in the cylinder so that the compressed air-fuel mixture surrounds the spark gap. The sparks cause the compressed air-fuel mixture to ignite.

As a result of the high voltages that are applied to the middle electrode 18 during the operation, the middle electrode 18 heats up greatly. Since the middle electrode 18 is typically manufactured from metal, the temperature increase causes said middle electrode to expand to a relatively great extent in comparison to the insulator 14, as a consequence of which the gap 19 is reduced in size but does not completely disappear. However, the gap is small enough to prevent any oil from passing into the said gap. If, however, the cylinder is switched off (deactivated mode), and the middle electrode 18 cools down, the gap 19 increases in size so that oil can then pass into the gap. If the cylinder is brought back into the activated mode, the oil becomes coked and deposits in the gap 19 that is now becoming smaller. The deposits can then come into contact with the insulator 14 as a result of the volume being consumed by said deposits and this can damage the insulator.

In accordance with the disclosure, when the switchable cylinder is in the deactivated mode, the heating device 30 is activated, as a result of which the middle electrode 18 is heated up. As a consequence, the middle electrode 18 does not contract or only contracts to an insignificant extent so that the gap 19 does not increase in size and oil cannot pass into the gap 19. As a result, the oil does not become coked and deposits are not formed when the cylinder is returned to the activated mode. In this way, oil is prevented from coking or the extent to which it becomes coked is at least reduced. The deposits that could occur as a result are also unable to damage the insulator 14 so that the ignition plug 10 can operate over a longer period of time at full functional capability.

FIG. 1 shows example configurations of an ignition plug with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example.

Figure 2:
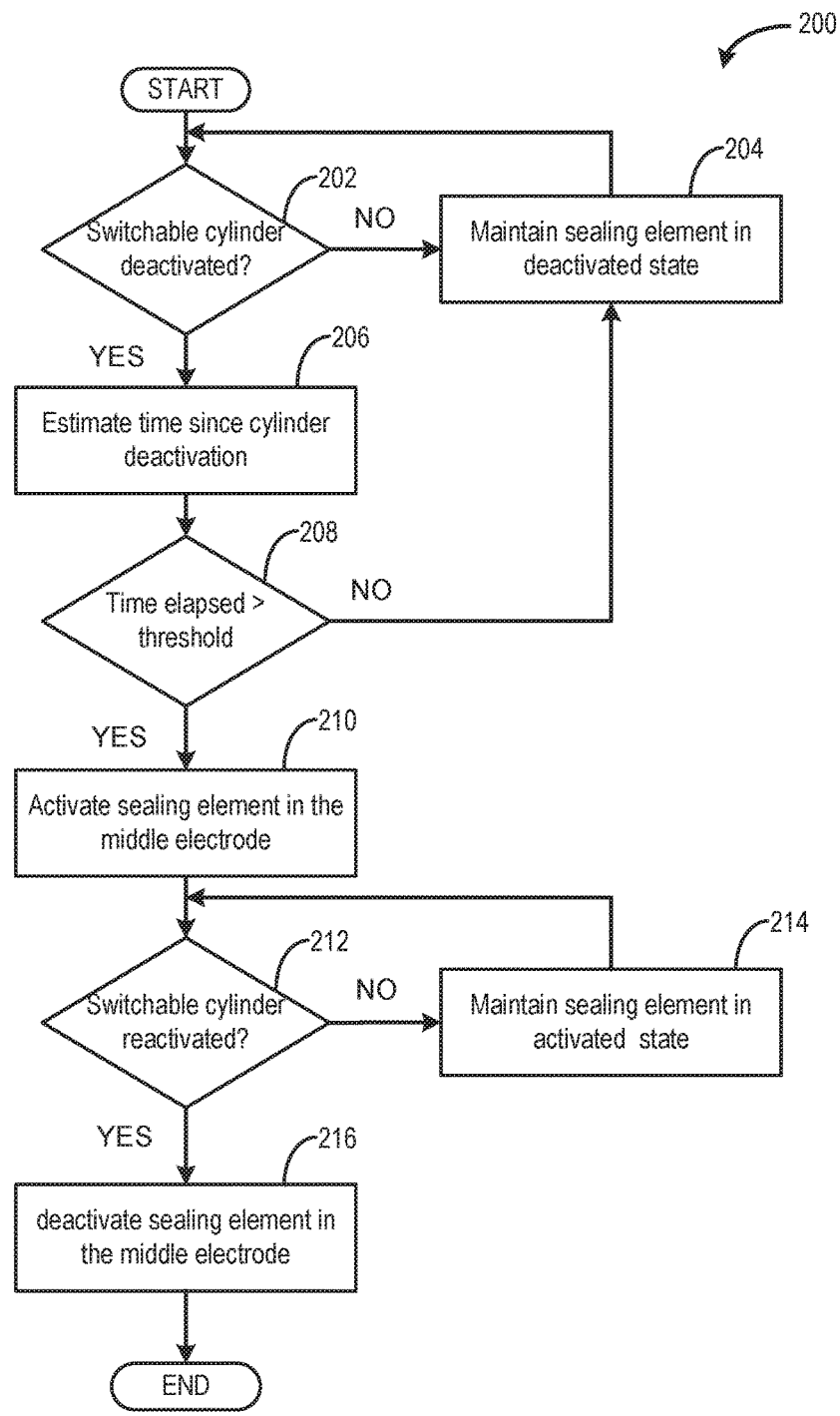
FIG. 2 shows a flowchart illustrating an example method for activating a sealing element in the ignition plug.

FIG. 2 shows a flowchart illustrating an example method for activating a sealing element in the ignition plug based on an operating mode of a switchable cylinder. Instructions for carrying out method 200 may be executed by a controller 26 of the engine based on instructions stored in a memory of the controller and in conjunction with signals received from sensors of the engine system and signals sent to actuators to adjust engine operation as described herein, such as valve deactivation mechanisms, the spark plug ignition coil actuators, etc.

At 202, the routine includes determining if a switchable cylinder of the internal combustion engine has been deactivated. A switchable cylinder may be deactivated based on engine operating conditions e.g., engine load, engine speed etc. For example, the switchable cylinder may be deactivated in response to a lower than threshold engine load, enabling the driver demanded torque to be provided by operating the remaining active cylinders at a higher efficiency. In the active state of the switchable cylinder, during operation of the ignition plug, the middle electrode of the ignition plug of said switchable cylinder is heated thereby causing expansion of the electrode and narrowing of the annular gap between the insulator and the middle electrode. This keeps the annular gap narrow (e.g., at an optimal gap also termed as gap seal). Consequently seepage of oil through the gap and the consequent damage to the insulator may be reduced. If it is determined that the switchable cylinder is in the active state (that is, the switchable cylinder has not been deactivated), at 204, the sealing element may be maintained in a deactivated state as the gap in this case is already narrow. Maintaining the sealing element in the deactivated state includes not supplying a current to the heating wires of the sealing element.

If it is determined that the switchable cylinder has been deactivated, at 206, the time elapsed since the deactivation of the cylinder is estimated. At 208, the routine includes determining if the time elapsed since the deactivation of the switchable cylinder is higher than a threshold time. If the time elapsed since deactivation is higher than threshold, the middle electrode temperature may drop and consequently the gap between the insulator and the middle electrode may increase (due to contraction of the middle electrode). If the gap increases beyond the gap seal, oil may seep into the gap thereby causing damage to the insulator.

If it is determined at 208 that the time elapsed since the deactivation of the switchable cylinder is lower than the threshold time, it may be inferred that the gap is sufficiently narrow, reducing the possibility of insulator damage from seepage of oil into the gap. Therefore, at 204, the sealing element may be maintained in the deactivated state by not supplying a current to the heating wires of the sealing element.

If it is determined that the time elapsed since cylinder deactivation is longer than the threshold time, at 210, the sealing element in the middle electrode may be activated. The sealing element may be activated by an ignition coil coupled to the ignition plug or by an open-loop and closed-loop unit used for controlling the combustion engine in an open-loop and/or closed loop manner. In one example, the sealing element may comprise a heating device for heating the middle electrode which in turn may comprise heating wires that run through the middle electrode. Due to high electrical resistance of the heating wires, upon passage of current, the wires heat up under the influence of an electrical current and cause the middle electrode to heat up and expand. Due to the expansion of the middle electrode, once again the gap between the insulator and the middle electrode may decrease. Therefore during cylinder deactivation, ignition coil is not used to send current to plug for ignition event but may be used to send current to the sealing element (heating device) to seal the gap. In this way during cylinder deactivation the gap may be regulated to prevent any seepage of oil causing damage to the ignition plug.

At 212, the routine includes determining if the switchable cylinder has been reactivated. In one example, the switchable cylinder is reactivated when the engine load is higher than the threshold load. Based on the state of the switchable cylinder, operation of the sealing element is adjusted. If it is determined that the switchable cylinder is continued to be in a deactivated state (that is, it has not been reactivated), at 214, the sealing element may be maintained in an active state in order to maintain the narrow gap. If it is determined that the switchable cylinder has been reactivated (for example due to high engine load), at 216, the sealing element may be deactivated by switching off the heating device coupled to the middle electrode. As the switchable cylinder is in the active state, due to the resumed operation of the ignition plug, the middle electrode may be heated and consequently the narrow gap may be maintained.

In one example, an ignition plug system comprises a housing that can be connected to a cylinder; an insulator fastened to the housing, the insulator comprising an axial bore hole; a middle electrode arranged in the axial bore hole to form an annular gap between the middle electrode and the insulator; a ground electrode fastened to the housing; and a controller with computer readable instructions stored on non-transitory memory for: activating a sealing element of the ignition plug in dependence upon an operating mode of the cylinder so as to seal the gap. In the preceding example, additionally or optionally, the cylinder is a switchable cylinder of a combustion engine, and wherein the ignition plug initiates combustion in the switchable cylinder when the cylinder is in an active mode. In any or all of the preceding examples, additionally or optionally, the controller includes instructions to operate the switchable cylinder in the active mode in response to driver torque demand being higher than a threshold, and operate the switchable cylinder in the deactivated mode in response to driver torque demand being lower than the threshold. In any or all of the preceding examples, additionally or optionally, the ignition plug includes an ignition coil for initiating an ignition event in the cylinder, and wherein the sealing element is activatable by the ignition coil that cooperates with the ignition plug. In any or all of the preceding examples, additionally or optionally, the sealing element is activatable by the controller in an open-loop or a closed loop manner. In any or all of the preceding examples, additionally or optionally, the sealing element comprises a heating device coupled to the controller for heating the middle electrode. In any or all of the preceding examples, additionally or optionally, the heating device comprises one or more heating wires extending through the middle electrode. In any or all of the preceding examples, additionally or optionally, the controller has computer-readable instructions stored on non-transitory memory for: activating the heating device in response to activation of the sealing element; and deactivating the heating device in response to deactivation of the sealing element.

In another example, a method for operating an ignition plug of an engine, comprises activating a sealing element via a controller responsive to determining that a switchable cylinder is being operated in a deactivated mode; and deactivating the sealing element via the controller responsive to determining that the switchable cylinder is being operated in an activated mode. In the preceding example, additionally or optionally, the activation of the sealing element is based on a threshold time, the controller activating the element when time elapsed since switchable cylinder deactivation is higher than a threshold time. In any or all of the preceding examples, additionally or optionally, the threshold time is based on a time required for a middle electrode of an ignition plug to contract beyond a threshold amount after switchable cylinder deactivation. In any or all of the preceding examples, additionally or optionally, the ignition plug comprises: a housing connected to the cylinder, an insulator fastened to the housing and comprising an axial bore hole, a middle electrode that is arranged in the axial bore hole to form an annular gap between the middle electrode and the insulator, a ground electrode that is fastened to the housing, and a sealing element that is activatable so as to seal the gap. In any or all of the preceding examples, the sealing element additionally or optionally comprises one or more heating wires extending through the middle electrode. In any or all of the preceding examples, additionally or optionally, the sealing element comprises one or more heating wires extending through the middle electrode. In any or all of the preceding examples, additionally or optionally, activating the sealing element includes passing electric current through the sealing element via the controller activating a switch to supply the current from a vehicle battery. In any or all of the preceding examples, additionally or optionally, passing current through the sealing element includes increasing temperature of the middle electrode. Any or all of the preceding examples, additionally or optionally, further comprises decreasing the annular gap via the controller responsive to expansion of the electrode.

In yet another example, a method for an engine, comprises in response to selective deactivation of a switchable engine cylinder, deactivating an ignition plug of the cylinder; supplying a current to a middle electrode of the ignition plug to maintain a temperature of the middle electrode above a threshold temperature while the plug is deactivated and without combustion in the cylinder; and activating a sealing element of the middle electrode. The preceding example, additionally or optionally, further comprises during a first condition, when a switchable cylinder is active, operating an ignition coil of an ignition plug of the cylinder to initiate an ignition event in the cylinder; and during a second condition, when the cylinder is deactivated, operating the ignition coil to heat a middle electrode of the plug without initiating an ignition event in the cylinder.

In this way, based on the state of operation of the switchable cylinder, a sealing element of an ignition plug may be controlled in order to maintain an annular gap between the insulator and the middle electrode of the ignition plug in a narrow state. The technical effect of maintaining a narrow gap around the middle electrode of the ignition plug, even when the ignition plug of a switchable cylinder is not being used, is that seepage of oil through the gap is reduced. The technical effect of having a heating element coupled to the middle electrode is that the gap size may be adjusted by simply varying a current passed through the heating element, and without the requirement for any additional heating components. By reducing entry of oil into the gap during conditions when the ignition plug is not in use, damage to the insulator incurred due to coking of oil deposits in the gap may be reduced. As such, this extends ignition plug component life and improves ignition performance of the engine.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An ignition plug system comprising:
    a housing that can be connected to a cylinder;
    an insulator fastened to the housing, the insulator comprising an axial bore hole;
    a middle electrode with a sealing element arranged in the axial bore hole to form an annular gap between the middle electrode and the insulator;
    a ground electrode fastened to the housing; and
    a controller with computer readable instructions stored on non-transitory memory for:
        activating a sealing element of an ignition plug responsive to a deactivated state of the cylinder so as to seal the gap by the sealing element increasing in size to decrease a size of annular gap.

2. The system of claim 1, wherein the cylinder is a switchable cylinder of a combustion engine, and wherein the ignition plug initiates combustion in the switchable cylinder when the cylinder is in an active mode.

3. The system of claim 2, wherein the controller includes instructions to operate the switchable cylinder in the active mode in response to driver torque demand being higher than a threshold, and operate the switchable cylinder in the deactivated mode in response to driver torque demand being lower than the threshold.

4. The system of claim 1, wherein the ignition plug includes an ignition coil for initiating an ignition event in the cylinder, and wherein the sealing element is activatable by the ignition coil that cooperates with the ignition plug.

5. The system of claim 1, wherein the sealing element is activatable by the controller in an open-loop manner or a closed loop manner.

6. The system of claim 1, wherein the sealing element comprises a heating device coupled to the controller for heating the middle electrode.

7. The system of claim 6, wherein the heating device comprises one or more heating wires extending through the middle electrode.

8. The system of claim 6, wherein the controller has computer-readable instructions stored on non-transitory memory for:
    activating the heating device in response to activation of the sealing element; and
    deactivating the heating device in response to deactivation of the sealing element.

9. A method for operating an ignition plug of an engine, comprising:
    activating a sealing element positioned in the ignition plug via a controller with computer-readable instructions stored on non-transitory memory to activate the sealing element responsive to determining that a switchable cylinder is being operated in a deactivated mode so as to seal an annular gap by expanding the sealing element to reduce a size of the annular gap, and deactivating the sealing element via the controller responsive to determining that the switchable cylinder is being operated in an activated mode.

10. The method of claim 9, wherein the activation of the sealing element is further based on a duration elapsed since the switchable cylinder is operated in the deactivated mode, the controller activating the sealing element when the duration lapsed is higher than a threshold time.

11. The method of claim 10, wherein the threshold time is based on a time required for a middle electrode of the ignition plug to contract beyond a threshold amount after switchable cylinder deactivation.

12. The method of claim 9, wherein the ignition plug comprises:
    a housing connected to the switchable cylinder;
    an insulator fastened to the housing and comprising an axial bore hole;
    a middle electrode that is arranged in the axial bore hole to form an annular gap between the middle electrode and the insulator;
    a ground electrode that is fastened to the housing; and
    a sealing element, wherein the sealing element is activatable so as to seal the annular gap.

13. The method of claim 9, wherein the sealing element comprises one or more heating wires extending through the middle electrode.

14. The method of claim 9, wherein activating the sealing element includes passing electric current through the sealing element via the controller activating a switch to supply the current from a vehicle battery.

15. The method of claim 14, wherein passing current includes passing current through the sealing element until a temperature of the middle electrode is higher than a threshold temperature.

16. The method of claim 9, further comprising decreasing the annular gap via the controller responsive to expansion of the electrode.

17. A method for an engine, comprising:
    in response to selective deactivation of a switchable engine cylinder, deactivating an ignition plug of the cylinder;
supplying a current to a middle electrode of the ignition plug to maintain a temperature of the middle electrode above a threshold temperature while the plug is deactivated and without combustion in the cylinder; and activating a sealing element of the middle electrode via a controller with computer-readable instructions stored on non-transitory memory to activate the sealing element so as to seal an annular gap by expanding the middle electrode to reduce a size of the annular gap.

18. The method of claim 17, further comprising:
during a first condition, when the cylinder is active, operating an ignition coil of the ignition plug of the cylinder to initiate an ignition event in the cylinder; and
during a second condition, when the cylinder is deactivated, operating the ignition coil to heat the middle electrode of the ignition plug without initiating an ignition event in the cylinder.

* * * * *